US009218668B2

(12) United States Patent
Rocque

(10) Patent No.: US 9,218,668 B2
(45) Date of Patent: Dec. 22, 2015

(54) DIFFERENTIATING AMONG A PLURALITY OF SUBJECTS IN A FIELD-OF-VIEW BASED ON VITAL SIGNS

(71) Applicant: KONINKLIJKE PHILIPS N. V., Eindhoven (NL)

(72) Inventor: Mukul Julius Rocque, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 14 days.

(21) Appl. No.: 14/187,588

(22) Filed: Feb. 24, 2014

(65) Prior Publication Data

US 2014/0241588 A1    Aug. 28, 2014

Related U.S. Application Data

(60) Provisional application No. 61/770,365, filed on Feb. 28, 2013.

(30) Foreign Application Priority Data

Feb. 28, 2013    (EP) .................................... 13157247

(51) Int. Cl.
*G06K 9/00*    (2006.01)
*G06T 7/20*    (2006.01)

(52) U.S. Cl.
CPC .............. *G06T 7/20* (2013.01); *G06K 9/00335* (2013.01); *G06K 9/00885* (2013.01); *G06T 7/2006* (2013.01); *G06K 2009/00939* (2013.01); *G06T 2207/20021* (2013.01); *G06T 2207/30076* (2013.01); *G06T 2207/30196* (2013.01)

(58) Field of Classification Search
None
See application file for complete search history.

(56) References Cited

U.S. PATENT DOCUMENTS

| 7,431,700 | B2 | 10/2008 | Aoki et al. | |
|---|---|---|---|---|
| 7,567,833 | B2* | 7/2009 | De La Barrera et al. | 600/424 |
| 8,818,041 | B2 | 8/2014 | Cennini et al. | |
| 2007/0123756 | A1* | 5/2007 | Kitajima et al. | 600/300 |
| 2009/0141124 | A1 | 6/2009 | Liu et al. | |
| 2009/0226043 | A1 | 9/2009 | Angell et al. | |
| 2014/0243649 | A1 | 8/2014 | Rocque et al. | |
| 2014/0253709 | A1 | 9/2014 | Bresch et al. | |
| 2014/0276098 | A1 | 9/2014 | Bresch et al. | |
| 2014/0303503 | A1 | 10/2014 | Rocque et al. | |

FOREIGN PATENT DOCUMENTS

| CN | 201260669 Y | 6/2009 |
|---|---|---|
| WO | 2010100593 A1 | 9/2010 |

(Continued)

OTHER PUBLICATIONS

Nakajima, K., et al.; A method for measuring respiration and physical activity in bed by optical flow analysis; 1997; IEEE/EMBS; vol. 5:2054-2057.

Primary Examiner — Tahmina Ansari

(57) ABSTRACT

An apparatus for detecting different subjects on the basis of vital signs includes an image detection unit for detecting radiation from a field of view and for providing image data from the field of view. A detection unit defines image sections in the image data and detects movement patterns in each of the different image sections. An identification unit identifies vital signs in the different image section on the basis of the movement pattern. An analysis unit analyzes the image data and detects the different subjects in the field of view on the basis of a spatial separation of the image sections or of groups of image sections in which the vital signs are identified.

19 Claims, 8 Drawing Sheets

(56) References Cited

FOREIGN PATENT DOCUMENTS

| WO | 2011157873 | A1 | 12/2011 |
| WO | 2012140531 | A1 | 10/2012 |
| WO | 2012164453 | A1 | 12/2012 |
| WO | 2014131850 | A1 | 9/2014 |
| WO | 2014136027 | A1 | 9/2014 |
| WO | 2014140994 | A1 | 9/2014 |
| WO | 2014167432 | A1 | 10/2014 |

* cited by examiner

DIFFERENTIATING AMONG A PLURALITY OF SUBJECTS IN A FIELD-OF-VIEW BASED ON VITAL SIGNS

CROSS REFERENCE TO RELATED APPLICATIONS

This application claims the benefit of U.S. provisional application Ser. No. 61/770,365 filed Feb. 28, 2013 and European provisional application serial no. 13157247.1 filed Feb. 28, 2013, both of which are incorporated herein by reference.

FIELD OF THE INVENTION

The present invention relates to an apparatus and method for detecting subjects on the basis of vital signs, wherein image data is determined from the field of view, wherein vital signs are identified on the basis of movement pattern received from the subjects.

BACKGROUND OF THE INVENTION

Vital signs of a subject or a patient and in particular the respiration rate of a subject can be monitored remotely using a contactless sensor such as a video camera. A general method for determining a respiration rate from image data by means of pattern detection is known from WO 2012/140531 A1. Since the subject of interest can be located freely in the field of view of the camera, the subject and the relevant area from which the vital signs should be derived have to be detected and defined for extraction of the desired vital sign information. Further, different persons in the field of view have to be identified and distinguished for a precise remote measurement.

The traditional identification of the region of interest in general is based on the detection of the human being, e.g. the face or the chest or by using background segmentation.

For the identification of a human being and for measuring vital signs such as a pulse or a respiration rate from a region of interest, US 2009/0141241 suggests to detect the contour segmenting of an infrared video segment to select the region of interest representing a portion of a subject to be measured.

Further, US 2009/0226043 A1 discloses a method for detecting respiratory patterns, wherein the region of interest and in particular the person of interest or different persons of interest are identified on the basis of respiratory pattern changes which indicate behavioral deviations of the persons to be detected.

The disadvantage of the known identification methods is that the camera has to be fixed and additional background information is necessary in order to detect the human beings in the field of view. Further, the known methods are not applicable or not reliable if the persons in the field of view are partially occluded or if the person is obstructing the background before the background has been identified by the camera.

SUMMARY OF THE INVENTION

It is therefore an object of the present invention to provide an apparatus and a method for identifying subjects on the basis of vital signs providing a higher flexibility of the use and a higher reliability of the subject detection. Further, it is an object of the present invention to provide a computer program causing a computer to detect subjects on the basis of vital signs when it is carried out on a computer.

According to one aspect of the present invention, an apparatus for detecting subjects on the basis of a vital sign is provided, comprising:
an image detection unit that detects radiation from a field of view and that provides image data from the field of view,
a detection unit that defines image sections in the image data and that detects movement pattern in the different image sections,
an identification unit that identifies vital signs in the different image section on the basis of the movement pattern, and
an analysis unit that analyses the image data, wherein the analysis unit detects the different subjects in the field of view on the basis of a spatial separation of the image sections or of groups of image sections in which the vital signs are identified.

According to another aspect of the present invention, a method for detecting different subjects on the basis of vital signs is provided, comprising the steps of:
detecting radiation from a field of view and providing image data from the field of view,
defining image sections in the image data and detecting movement pattern in the different image sections,
identifying vital signs in the different image sections on the basis of the movement pattern, and
detecting the different subjects in the field of view on the basis of a spatial separation of the image sections or of groups of the image sections in which the vital signs are identified.

According to still another aspect of the present invention a Computer readable non-transitory medium is provided having instructions stored thereon which, when carried out on a computer, cause the computer to perform the following steps of the method as claimed in claim 14.

Preferred embodiments of the present invention are defined in the dependent claims. It should be understood that the claimed method has similar and/or identical preferred embodiments as the claimed device and as defined in the dependent claims.

The present invention is based on the idea to identify different subjects, e.g. human beings in a video sequence based on the position of the respiration signal. The breathing motion is detected by identifying movement pattern in the image derived from the field of view. To identify the position of the respiration signals, the image data is divided in different image sections, which are separately analyzed and from which movement pattern are determined. The different subjects in the field of view are identified on the basis of a spatial separation of those image sections in which vital signs are identified. In other words if the vital signs which are detected at different image sections separated from each other with a respective distance, the signs are identified as vital signs from different subjects in the field of view. Since the present apparatus and the present method is merely based on the identification of movement pattern and not based on background segmentation or based on contour identification of the persons to be measured, the apparatus and the method can be used with a high flexibility and provide a reliable identification of different persons in the field of view.

In a preferred embodiment, the movement patterns are determined on the basis of frame detection or edge detection. This is a reliable possibility to detect the respiration of a subject in the field of view even if the skin of the person to be measured is covered e.g. by clothes.

In a preferred embodiment, the identification unit is adapted to derive an alternating signal from the respective movement pattern for each of the image sections. This is a simple solution to identify vital sign information from a subject and to distinguish the vital signs from other signals in the image data with low technical effort.

In a preferred embodiment, the identification unit comprises a frequency analysis device that analyses the frequency spectrum of the alternating signals in order to identify vital signs. This is a reliable solution to identify the vital signs with low technical effort, since the vital signs have a characteristic frequency range.

It is further preferred if the frequency analysis device is adapted to determine spectral parameter on the basis of each of the alternating signals to identify the vital signs. This is a reliable possibility to identify the vital signs, since the vital signs usually have a small frequency range and can be easily distinguished from other alternating signals which are not based on vital signs.

In a preferred embodiment, the analysis unit is adapted to combine connected image sections to a first group of image sections on the basis of the respective alternating signals. This is a possibility to identify one subject in the field of view with low technical effort, since the image sections connected to each other are assumed to represent the vital signs of a single subject.

According to a preferred embodiment, the analysis unit is adapted to combine the connected image sections to the first group of image sections on the basis of the respective spectral parameters and a predefined threshold value. In other words, the image sections, which are adjacent to each other and have a spectral parameter larger than the predefined threshold value are grouped to the first group of image sections in order to identify a first subject in the field of view. This is a simple solution to distinguish the vital signs of a single subject from background signals and from noise in the image data.

In a preferred embodiment, the analysis unit is adapted to combine connected image sections, which are separated from the first group of sections to a second group of image sections on the basis of the respective alternating signals. This is a simple solution to identify vital signs, which are received from a second subject since the different vital signs can be easily distinguished by the separation of the image sections from each other.

In a preferred embodiment, the analysis unit is adapted to combine the connected image sections to the second group of image sections on the basis of the respective spectral parameter and a predefined threshold value. This is a reliable solution to identify different image sections each receiving movement patterns from the second subject.

In a preferred embodiment, the frequency analysis device is adapted to determine a spectral energy of a predefined spectral range as the spectral parameter. This is a simple possibility to determine a signal strength of the movement pattern in order to identify whether a vital sign is received and in order to define the region of interest from the respective subject.

In a preferred embodiment, the first group of image sections is defined by selecting an initial image section on the basis of the spectral parameter and wherein image sections adjacent to the initial image section are selected as connected image sections of the first group on the basis of the respective spectral parameter and the predefined threshold level. This is a reliable possibility to define the first group of image sections in order to detect the first subject in the field of view since the initial image section can be easily identified on the basis of the signal quality of the spectral parameter and wherein easily the signal quality received from the adjacent image sections can be analyzed, whereby the first subject and the respective region of interest can be easily determined.

In a preferred embodiment, the second group of image sections is defined by selecting an initial image section separated from the first group of image sections on the basis of the spectral parameter and wherein image sections adjacent to the initial image section are selected as connected image sections of the second group on the basis of the respective spectral parameter and the predefined threshold level. This is a simple solution to define the second group of image sections in order to identify separate the second subject on the basis of the vital signs.

In a preferred embodiment, the image sections are selected as the initial image sections having the highest spectral parameter value. This is a simple solution to identify the initial image sections, since the spectral parameter value can be easily compared and the respective image sections can easily be detected.

As mentioned above, the present invention provides a flexible and reliable possibility to identify different subjects on the basis of vital signs, since merely the movement patterns are used to identify the subjects and the subjects are distinguished on the basis of the separation or the distance of the image sections from which the vital signs are received. Therefore, the present invention works reliably even if the subjects are partially occluded or if a background detection is not possible. Hence, the camera to identify the subjects does not need to be fixed and the reliability of the detection is not dependent on the field of view.

Hence, a flexible and reliable detection of subjects on the basis of vital signs can be provided.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
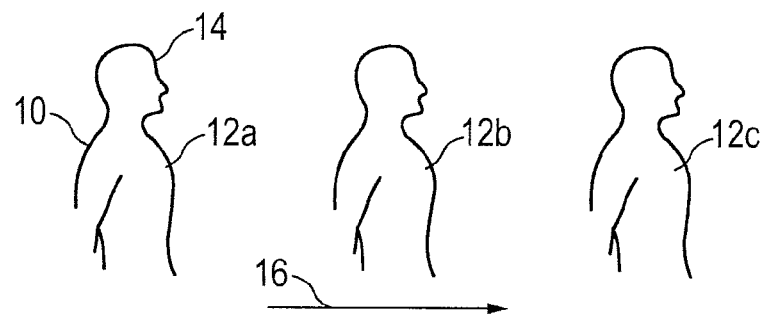
FIG. 1 shows a schematic illustration of a subject's motion indicative of an exemplary vital sign.

FIG. 1 shows a schematic illustration of a subject 10 which experiences motion indicative of a signal of interest. The subject 10 undergoes a characteristic motion of an indicative portion 12 due to respiration. When breathing, expansion and contraction of the lungs causes slight motion of characteristic portions of living beings, e.g. lifting and lowering of the chest. Also abdominal breathing can cause characteristic motion of respective parts of the object's body. At least partially periodic motion patterns induced by physiological processes can occur in many living beings, particularly in humans or animals.

Over time, as indicated by an arrow 16, the indicative portion 12 is moved between a contracted position, indicated by reference numerals 12a, 12c, and an extracted position, indicated by 12b. Essentially, based on this motion pattern, for instance the respiration rate or respiration rate variability can be assessed. While the indicative portion 12 is pulsating over time, a non-indicative portion 14 remains substantially motionless. Certainly, also the non-indicative portion 14 undergoes diverse motion over time. However, these motions do not correspond to the periodic pulsation of the indicative portion 12.

Figure 2:
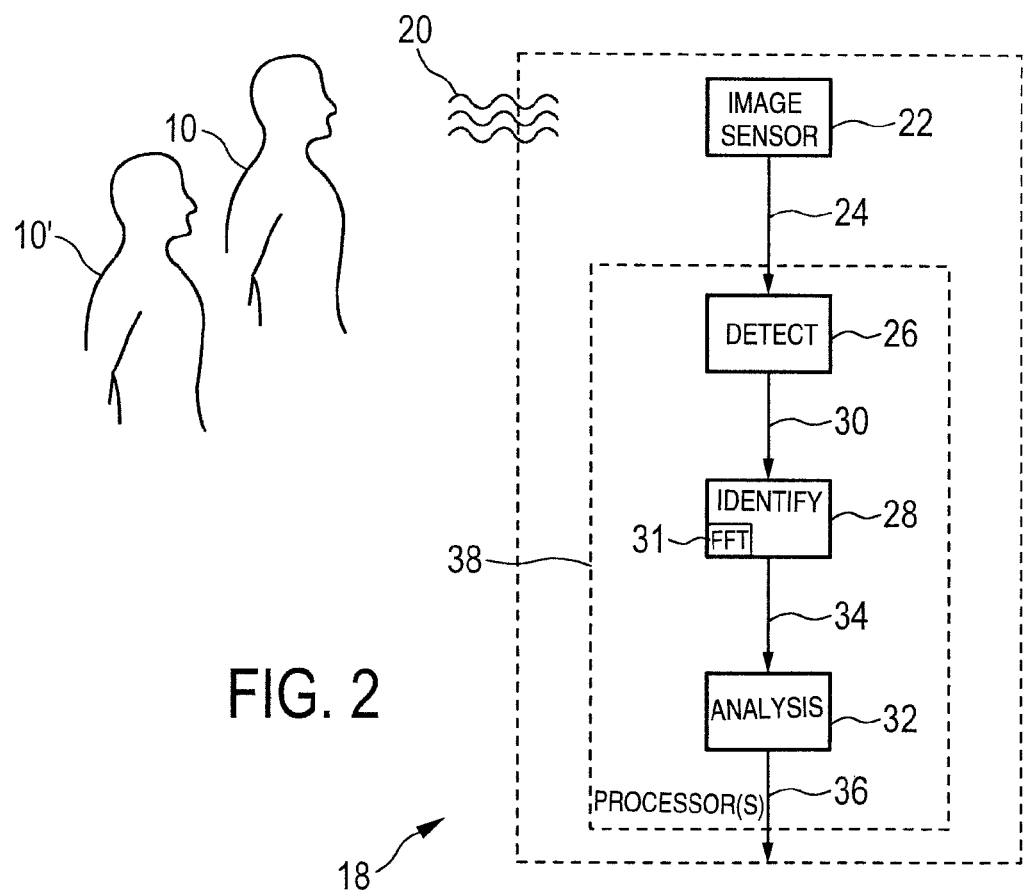
FIG. 2 shows a schematic drawing of an apparatus for detecting different subjects on the basis of vital signs.

In this context, referring to FIG. 2, an apparatus for detecting subjects 10, 10' is illustrated and denoted by a reference numeral 18. The apparatus 18 can be utilized for recording image frames of a plurality of subjects 10, 10'. The image frames can be derived from electromagnetic radiation 20 emitted or reflected by the subjects 10, 10'. For extracting information from the image data, e.g. a sequence of image frames or a continuous image stream, a field of view can be observed by an image sensor 22. The image sensor 22 can be embodied, by way of example, by a camera adapted to capture information belonging to at least a spectral component of the electromagnetic radiation 20. It goes without saying that the device 18 also can be adapted to process input signals, namely an input data stream, already recorded in advance and, in the meantime, stored or buffered. As indicated above, the electromagnetic radiation 20 can contain a continuous or discrete characteristic signal which can be highly indicative of at least one at least partially periodic vital signal.

Known methods for obtaining such vital signals comprise tactile respiration rate monitoring or remote respiration rate monitoring relying on markers applied to the subject 10, 10' of interest. To this end, however, obtrusive monitoring is required. As indicated above, an alternate approach is directed to unobtrusive remote measuring utilizing image processing methods.

The image sensor 22 captures images e.g. monochrome images from the field of view including the subjects 10, 10' and provides a continuous or discrete image data 24 to a detection unit 26. The detection unit 26 is adapted to define image sections in the image data 24 received from the image detection unit 22 and is adapted to detect movement pattern in the different image section of the image data 24 as described in the following. The detection unit 26 detects the movement pattern by pattern or edge detection in the image data in order to detect the movement of the indicative portion 12 of the subjects 10, 10' in the field of view and to detect the vital signs from the subjects 10, 10'. The pattern or edge detection is performed for example as disclosed in WO 2012/140531 A1. The detection unit 26 is connected to an identification unit 28 and provides signals 30 including the movement pattern detected in the different image sections to the identification unit 28. The identification unit 28 derives a motion vector and/or an alternating signal from the movement pattern received from the detection unit 26 for each of the image sections defined by the detection unit 26. The identification unit 28 comprises a frequency analysis device 31 for analyzing a frequency spectrum of the alternating signals to identify the vital signs from each of the image sections. The frequency analysis device 31 is adapted to perform a Fourier analysis, in particular a Fast Fourier Transformation (FFT) in order to provide a frequency spectrum of the alternating signals. The identification unit 28 determines a spectral energy for predefined frequency ranges in order to identify the vital signs in the image section and to distinguish the vital signs from other signals and from noise of the image data 24.

If the spectral energy in a predefined frequency range e.g. for adults between 0 and 1 Hz or e.g. for infants between 0 and 2 Hz is equal to or larger than a predefined threshold level compared to the spectral energy of another spectral range or to the entire spectral energy of the signal, e.g. 50% of the entire spectral energy of the measured frequency spectrum, the respective image section is identified as an image section in which vital signs are detected. The detailed frequency analysis is described in detail in the following.

The identification unit 28 is connected to an analysis unit 32 to provide analysis data 34 of the frequency analysis for each of the image sections to the analysis unit 32. The analysis unit 32 is provided in general to detect the subjects 10, 10' in the field of view on the basis of the frequency analysis data for each of the image sections and to determine the position of the respective image sections as described in the following.

The analysis unit 32 provides as an output signal 36 the detected region of interest corresponding to the position where the different subjects 10, 10' are detected. The output signal 36 may be provided to a processing unit (not shown) in order to evaluate the data and to evaluate the vital sign information received from the subjects 10, 10', e.g. in order to calculate the respiration rate of the subjects 10, 10'.

The detection unit 26, the identification unit 28 and the analysis unit 32 can be jointly embodied in a common processing unit 38, e.g. a central processing unit having a single processor or multiple processors. The processing unit (not shown) for evaluating the data may also be integrated in the common processing unit 38. By way of example, the processing device 38 can be embodied by a Personal Computer driven by respective logic commands. In case the imaging detection unit 32 is also jointly connected to the processing unit 38, a capturing may house the respective subcomponents. For instance, also a mobile device, e.g. a Smartphone, or a mobile health monitoring device, comprising a camera or being connectable to a camera can be utilized for carrying out the embodiment of the invention.

Figure 3:
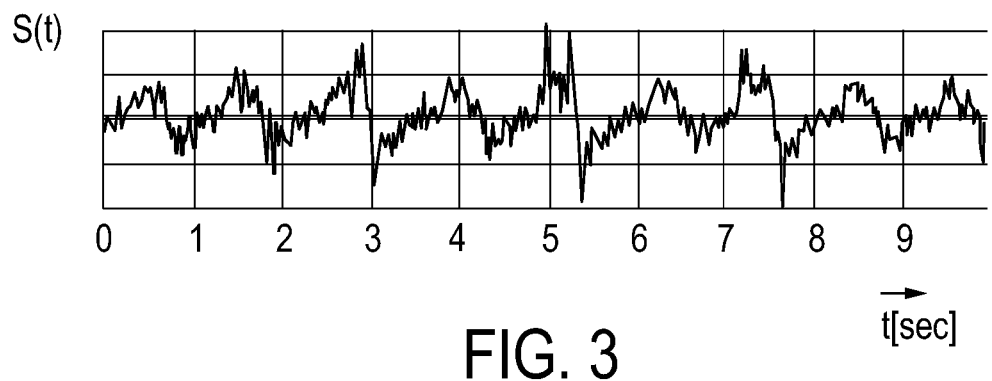
FIG. 3 shows a timing diagram of an alternating signal derived from the subjects.

FIG. 3 shows a timing diagram of an alternating signal derived from the movement pattern and/or from motion vectors derived from the movement pattern of the different image section which can be for example determined on the basis of a frame or an edge detection in the respective image section. The alternating signal is generally denoted as S(t). The alternating signal in this particular case corresponds to the movement of the indicative portion 12 of the subject 10, 10' derived from an image section detecting the image data from the respective indicative portion 12. The alternating signals show a characteristic variation corresponding to the movement of the indicative portion 12 i.e. the breathing rate of the subject 10. The alternating signal also shows a high-frequency noise superimposed to the breathing rate.

The alternating signal S is derived from each of the image sections of the field of view wherein a plurality of image sections comprise vital sign information such as a breathing rate and a plurality of image sections may comprise disturbing signals which are not related to vital sign information of the subjects 10, 10' or other alternating signals which comprise mostly high-frequency noise. In order to identify those image sections from which vital sign information can be derived, the analysis unit 32 comprises the frequency analysis device 31 to perform a frequency analysis of the alternating signal. The frequency analysis is preferably performed by filtering the alternating signals S and/or by performing a Fourier Transformation, in particular a Fast Fourier Transformation (FFT) of the alternating signal S. From the alternating signal, a frequency spectrum is derived in order to identify the image section including vital sign information as described in the following.

Figure 4:
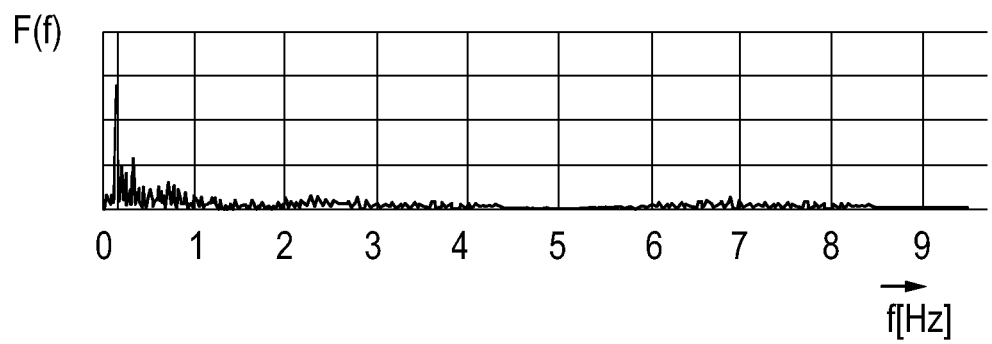
FIG. 4 shows a frequency diagram of the alternating signal shown in FIG. 3, FIG. 5A-G show a schematic image segmentation for illustrating the detection of different subjects in a field of view.

FIG. 4 shows a frequency spectrum of the alternating signal S shown in FIG. 3 generally denoted by F(f). The frequency spectrum F shows a large frequency component in a low frequency band, in this particular case between 0 and 1 Hertz, which correspond to the breathing rate of an adult which is normally not higher than 1 Hertz and corresponds to 60 breathes per minute. The frequency components higher than a predefined frequency band, e.g. 1 Hertz for adults and 2 Hertz for infants are usually disturbing signals in the image data 24 or correspond to noise of the alternating signal S. In order to characterize the quality of the alternating signal S, the spectral energy of the alternating signal S is determined and an image section is defined as an image section including vital sign information if the spectral energy of the alternating signal S in a predefined frequency band exceeds a predefined threshold level or exceeds a percentage of spectral energy compared to a second frequency band, e.g. the whole frequency spectrum. E.g. if the spectral energy between 0 and 1 or 2 Hertz is larger than a predefined threshold level e.g. larger than 50% of the entire spectral energy of the alternating signal S or a predefined range of the spectrum, e.g. 2 . . . 3 Hz, 3 . . . 4 Hz, . . . . On the basis of the spectral energy, the image sections are evaluated to identify the different subjects 10, 10' in the field of view as described in the following.

FIGS. 5A-G show a schematic image from a field of view for explaining the detection of the different subjects 10, 10' on the basis of vital signs detected in the image data 24.

The field of view detected by the image detection unit 22 shown in FIGS. 5A-G is generally denoted by 40. An image 42 representing the field of view 40, which is captured by the image detection unit 22, shows the first subject 10 and the second subject 10' which are in this case human beings to be identified and to be measured.

In the image 42, a grid 44 defines different image sections 46 to distinguish different areas of the field of view 40 and to identify different signals in the field of view 40.

Figure 5A:
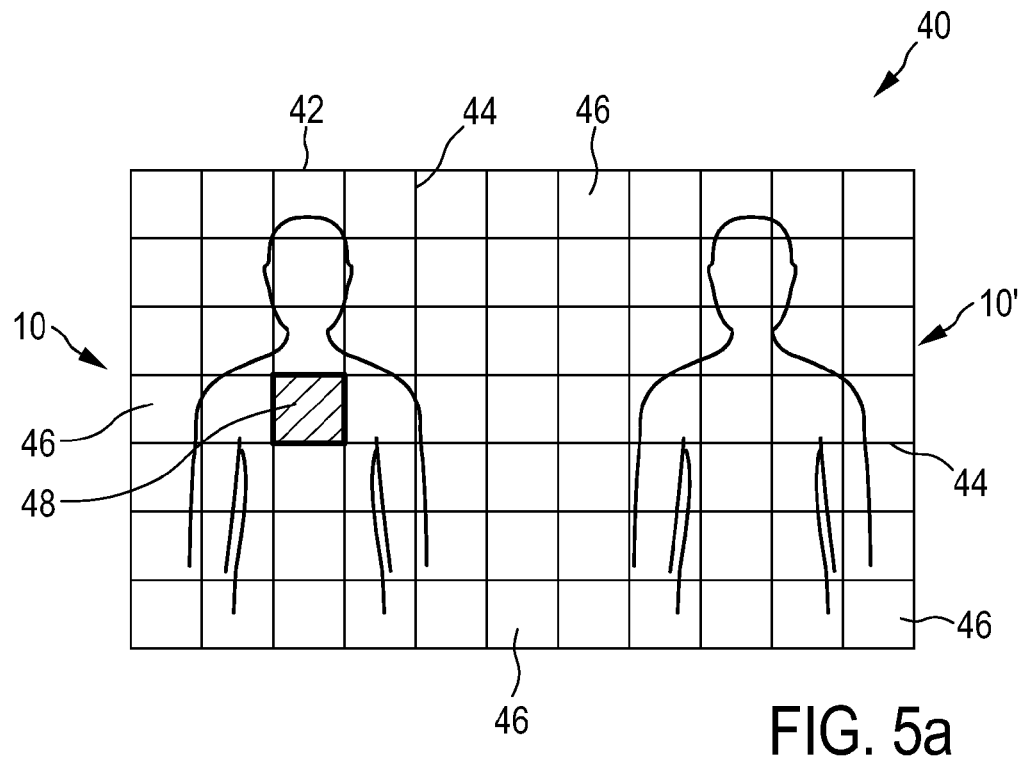
Figure 5B:
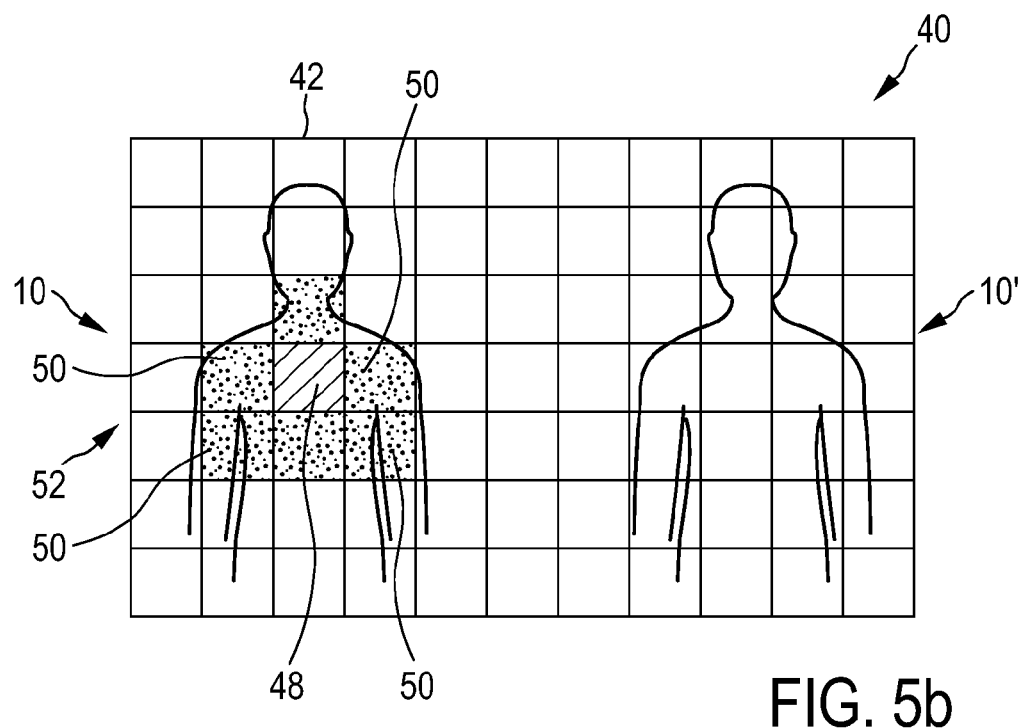

First, movement patterns are derived from each of the image sections 46 of the image data 24 and the alternating signals S are determined from motion vectors determined from the movement pattern of each of the image sections 46 as described above. On the basis of the frequency analysis performed by the frequency analysis device 31 it is determined whether the movement pattern of the different image section 46 corresponds to vital signs in the field of view 40 and, further, the quality of the vital signs are determined e.g. on the basis of the spectral analysis, in particular on the basis of the spectral energy as described above. The image section 46 having the highest value of persistent regarding the vital sign e.g. having the highest spectral energy in the predefined range is defined as initial section 48 or as seed block 48 as shown in FIG. 5A. Since the chest of a person usually provides the best vital sign information regarding the breathing rate, the image section 46 representing the chest of a subject to be detected is usually the initial section 48 as shown with respect to the subject 10 displayed in FIG. 5A. Image sections 50 which are connected or adjacent to the initial section 48 and which fulfill a persistence criteria, e.g. having a spectral energy value higher than the predefined threshold value are grouped together with the initial section 48 to a first group of image sections 52. The connected image sections 50 are indicated by dots. Those image sections 46, which are connected or adjacent to the initial section 48 but do not fulfill the persistence criteria are not grouped to the first group of image sections 52. Connected or adjacent image sections are usually the eight sections surrounding the initial section 48 or one section of the group of sections 52.

Figure 5C:
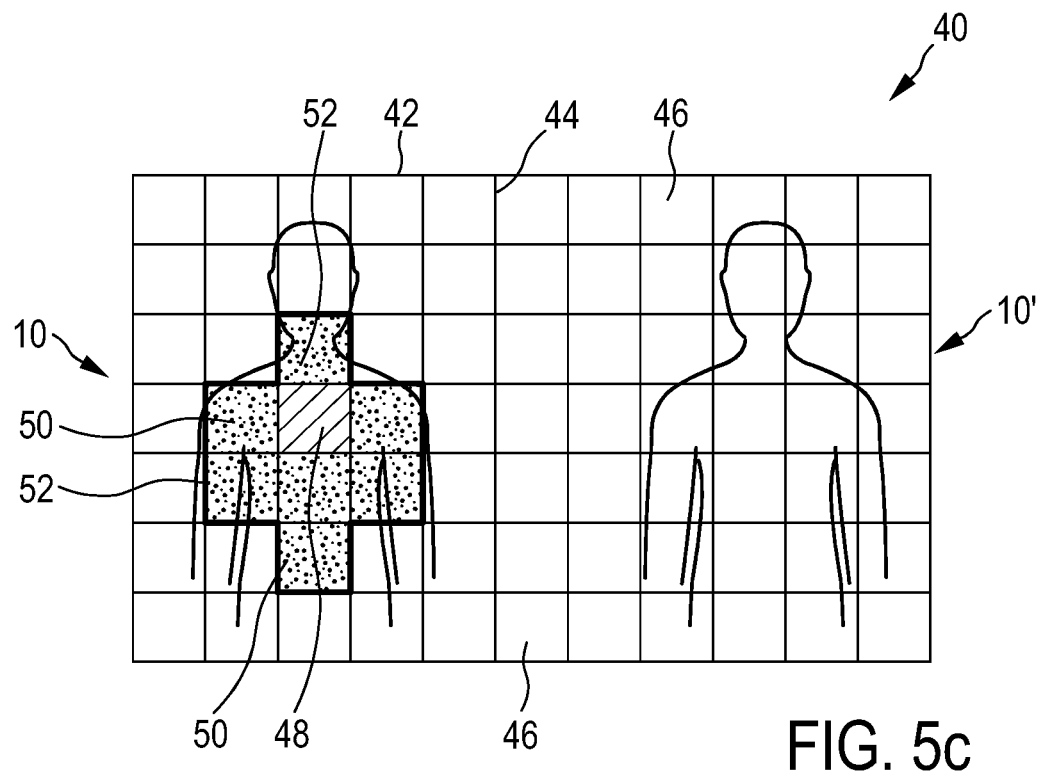

FIG. 5C shows a further step of identifying connected image sections 50 connected or adjacent to the first group of image sections 52 which fulfill the persistence criteria, e.g. having a spectral value or a spectral energy larger than the predefined threshold. In FIG. 5C one additional image section is added to the first group of image sections 52. The procedure to connect connected image sections 50 to the first group of image sections 52 is repeated as long as adjacent sections 46 fulfill the persistence criteria.

Figure 5D:
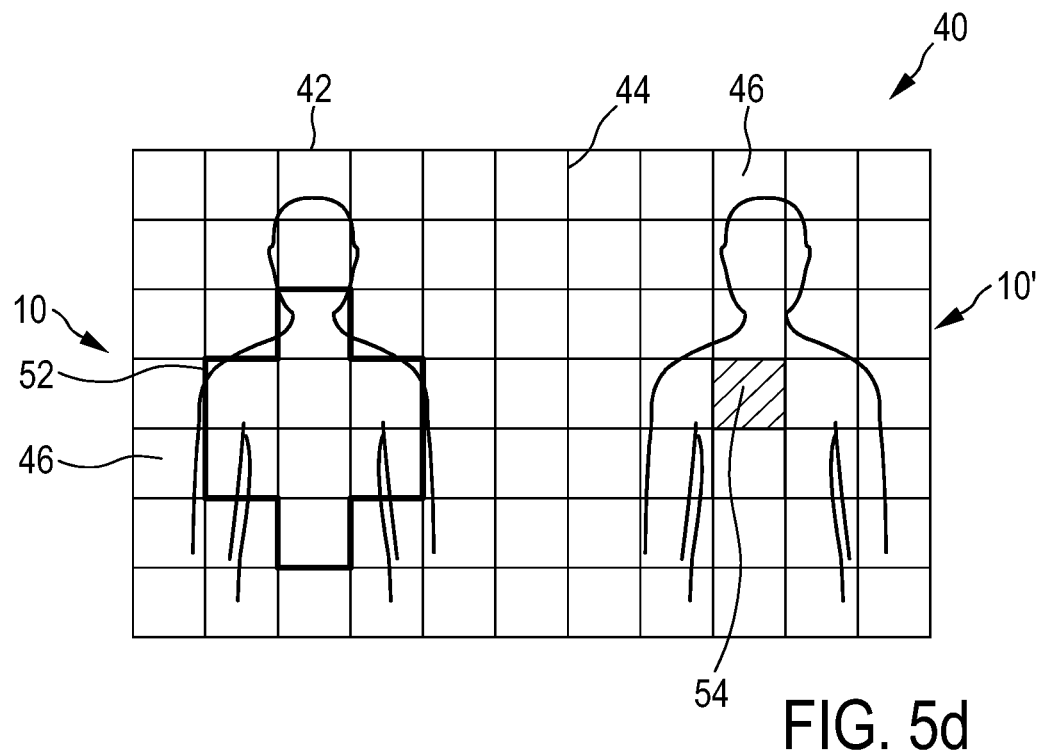

If no image section 46 fulfills the criteria to be grouped to the first group of image sections 52, the identified first group of image sections 52 is finalized so that the first subject 10 is identified in the field of view 40 as shown in FIG. 5D.

In order to identify the second subject 10' in the field of view 40 the image section 46 is identified having the highest quality of vital sign information, i.e. the largest spectral value or largest spectral energy of the alternating signal S and being separated from the first group of image sections 52 as second initial section 54. In other words the second initial section 54 is defined on the basis of the quality of the vital sign or the alternating signal S which is not part of the first group of image sections 52. The first group 52 and the second initial section 54 have to be separated by at least one section 46, which is not grouped. Since the chest usually provides the best vital sign information, the second initial section 54 corresponds to the position of the chest of the second subject 10' (the indicative portion 12).

Figure 5E:
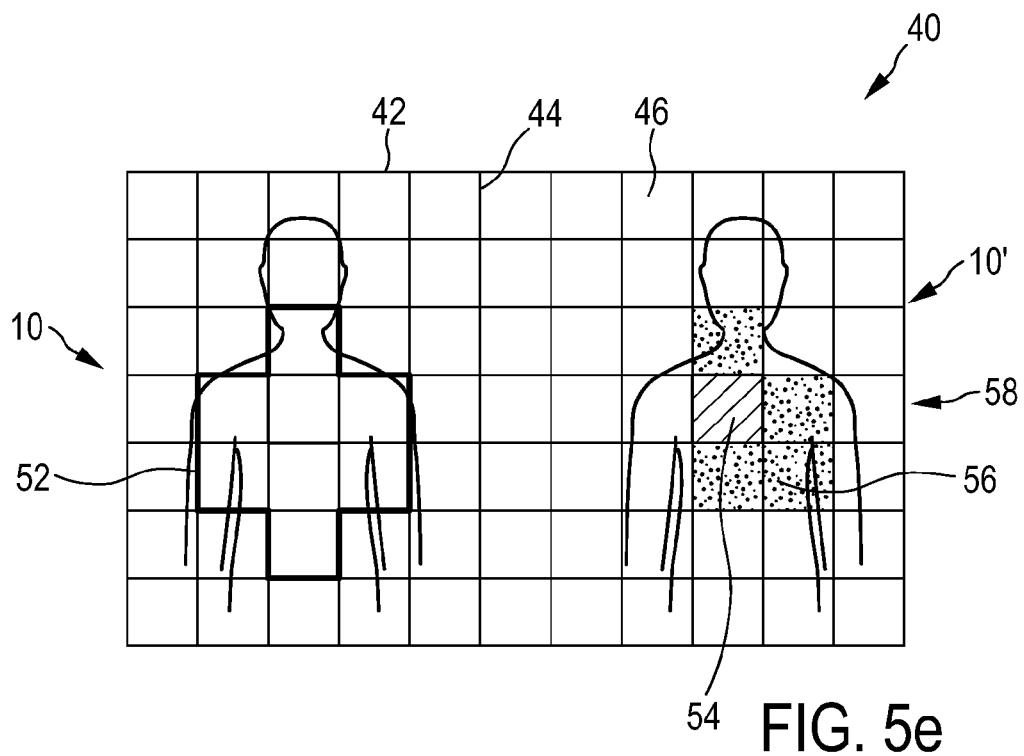

On the basis of the second initial section 54 identified in the field of view 40 image sections 56 which are connected or adjacent to the second initial section 54 and fulfill the persistence criteria, e.g. having a spectral value or a spectral energy larger than the predefined threshold value are grouped to a second group of image sections 58. The connected image sections 56 are indicated in FIG. 5E with dots. Connected image sections 56 are usually the eight image sections 46 surrounding the initial section 54. Further, the image sections 46 connected or adjacent to the second group of image sections 58 or surrounding the second group of image sections 58 are grouped to the second group of image sections 58 if the vital sign of these image sections 46 fulfill the persistence criteria as mentioned above.

Figure 5F:
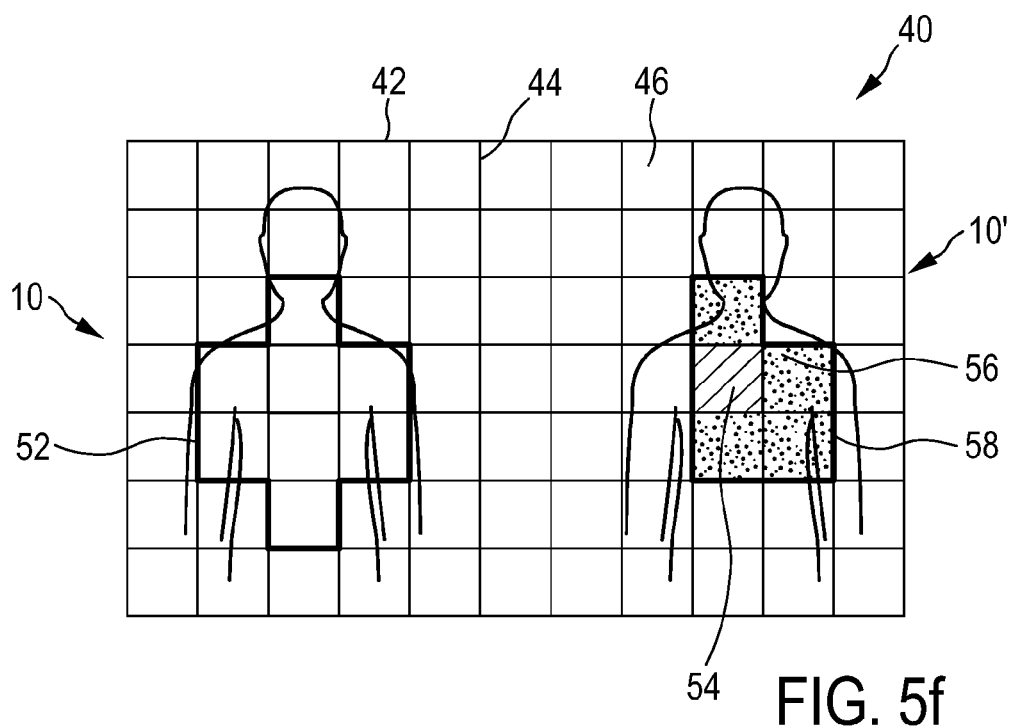

As shown in FIG. 5F, the second initial section 54 and the connected image sections 56 are defined as the second group of image sections 58.

In the case that no further image section 46 adjacent to the second group of image sections 58 fulfills the persistence criteria, the second group of image sections 58 is finalized and the second subject 10' is identified in the field of view 40.

Figure 5G:
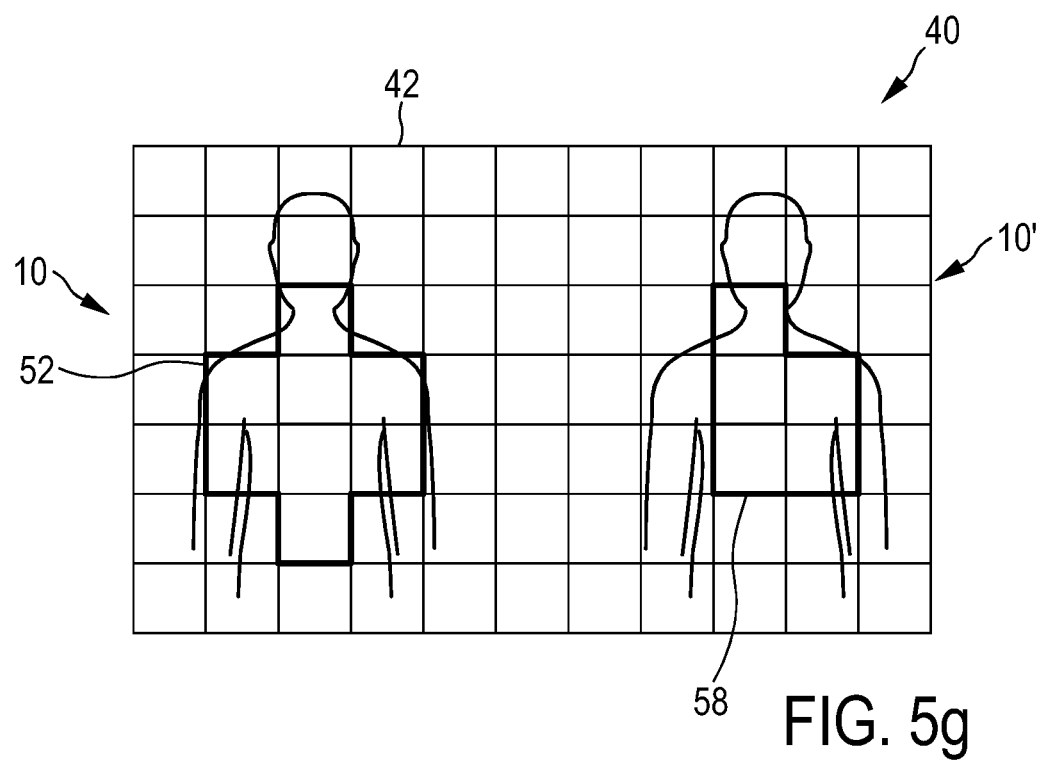

In FIG. 5G, the first group of image sections 52 identifying the first subject 10 is shown and separately from the first group of image sections 52, the second group of image sections 58 is shown identifying the second subject 10' in the field of view 40.

Hence, the two subjects 10, 10' are identified in the field of view 40 as shown in FIG. 5G and the vital signs can be separately derived from the image 42 in order to independently measure the vital sign information of the two different subjects 10, 10'.

Since the two subjects 10, 10' are only identified as different subjects on the basis of the spatial separation of the vital signs or the distance between the positions of the vital sign in the field of view 40, the method is independent of the background segmentation technique and independent of occlusion of faces or other patterns to be identified in the image 42.

Figure 6:
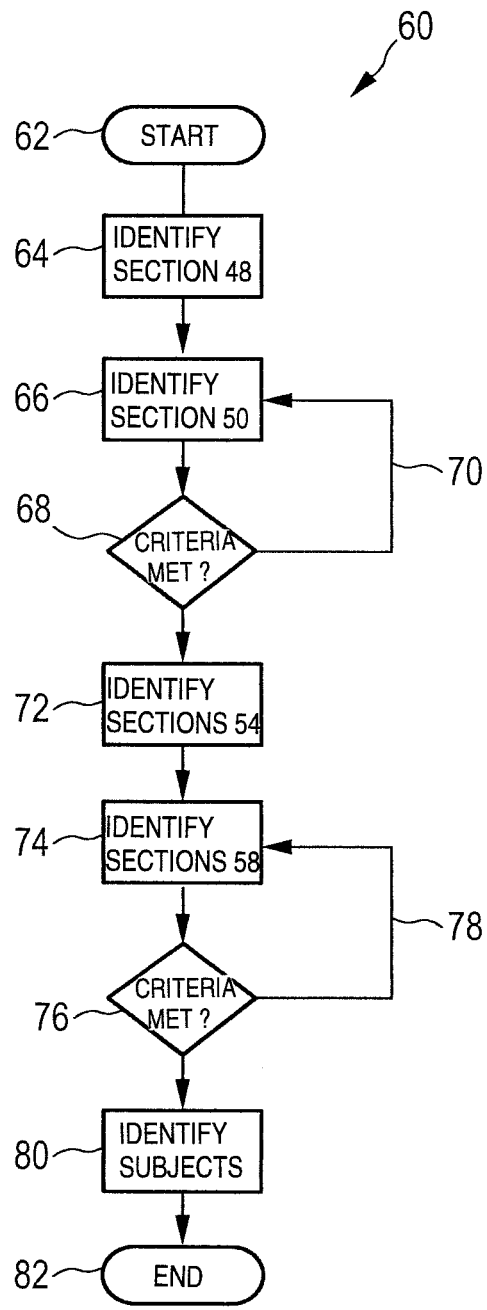
FIG. 6 shows a schematic block diagram representing the steps of an embodiment of a method to identify different subjects in a field of view.

FIG. 6 shows a schematic flow diagram illustrating an embodiment of the present method for detecting different subjects 10, 10' on the basis of vital signs. The method shown in FIG. 6 is generally denoted by 60.

The method 60 starts with step 62. At step 64, the first initial section 48 is identified in the field of view 40 having the overall largest vital sign, e.g. the larger spectral value and is defined as the first group of image section 52.

In step 66 all image sections 46 which are adjacent to the first group of image sections 52 are analyzed and grouped to the first group of image sections 52 if these image sections 46 fulfill the persistence criteria. At step 68, it is checked whether additional image sections 46 adjacent to the first group of image sections 52 fulfill the persistence criteria. If the image sections 46 adjacent to the first group of image sections 52 fulfill the persistence criteria, step 66 is repeated as shown by a feedback loop 70. Hence, all image sections 46 adjacent to each other which fulfill the persistence criteria are grouped to the first group of image sections 52.

If all image sections 46 surrounding the first group of image sections 52 do not fulfill the persistence criteria in step 72, the second initial image section 54 is identified in the field of view 40 having the largest vital sign in the field of view 40 and being separated from the first group of image sections 52. The second initial section 54 is defined as the second group of image sections 58.

In step 74, the image sections 46 adjacent to the second group of image sections 58 are analyzed and grouped to the second group of image sections 58 if these image sections 46 fulfill the persistence criteria.

At step 76 the image sections 46 adjacent to the second group of image sections 58 are analyzed whether they fulfill the persistence criteria, e.g. whether the spectral parameter or the spectral energy is larger than the predefined threshold level. The adjacent image sections fulfill the persistence criteria, step 74 is repeated as shown by a feedback loop 78. If none of the connected image sections fulfill the criteria, the two subjects 10, 10' are identified in the field of view 40 at step 80 and the method 60 ends at 82.

By means of the method 60, the two subjects 10, 10' can be easily identified and the region of interest from which the vital signs and in particular the respiration signals are detected are identified in the field of view 40. On the basis of the analysis of the variable signal S, the respiration rate can be easily detected as shown in FIG. 7.

Figure 7:
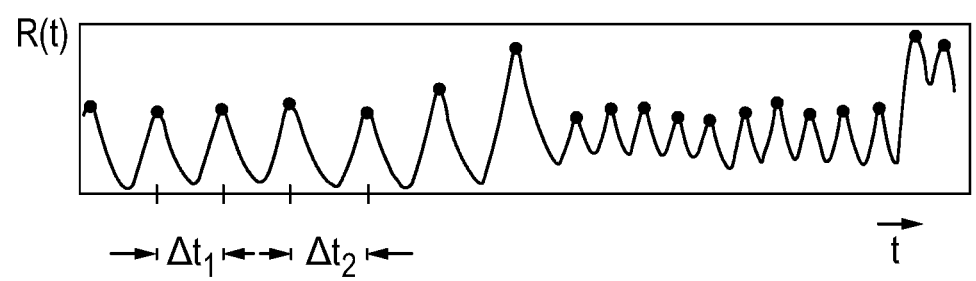
FIG. 7 shows a schematic timing diagram of a vital sign derived from the captured image data.

FIG. 7 shows a timing diagram of a filtered variable signal generally denoted by R(t), wherein the noise and disturbing signals are removed. In the such derived respiration signal R shown in FIG. 7, the respiration rate can be detected on the basis of the maxima of the respiration signal R as indicated by dots in FIG. 7. A time distance between the dots are shown in FIG. 7 as an example by $\Delta t1$ and $\Delta t2$. The respiration rate is calculated by means of the reciprocal value of the time distances $\Delta t1$, $\Delta t2$ between the dots in the respiration signal R or an average of the time distances shown in FIG. 7.

Hence, the respiration rate can be easily detected from the values derived from the image data 26 and, further, the different subjects 10, 10' can be identified by means of the apparatus 18 and the method 60 and the respiration rate of the subject can be determined on the basis of the region of interest provided by the apparatus 18 and the method 60.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or an does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible device or apparatus that can contain, store, communicate, propagate, or transport the program for use by or in connection with the instruction execution device.

In so far as embodiments of the disclosure have been described as being implemented, at least in part, by software-controlled data processing devices, it will be appreciated that the non-transitory machine-readable medium carrying such software, such as an optical disk, a magnetic disk, semiconductor memory or the like, is also considered to represent an embodiment of the present disclosure.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system or device suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated. Other variations to the disclosed embodiments can be understood and effected by those skilled in the art in practicing the claimed invention, from a study of the drawings, the disclosure, and the appended claims.

The invention claimed is:

1. An apparatus for detecting different subjects on the basis of vital signs, comprising:
    a camera configured to detect radiation from a field of view and provide image data from the field of view,
    a detection unit that defines image sections in the image data and that detects movement patterns in the different image sections,
    an identification unit that identifies vital signs in the different image section on the basis of the movement patterns, and
    an analysis unit that
        combines connected image sections in which vital signs are detected in a first group of image sections on the basis of a spectral parameter and a predefined threshold value of the movement patterns of the image sections,
        combines connected image sections in which vital signs are detected which are separated from the first group of image sections into a second group of image sections on the basis of the spectral parameter and the predefined threshold of movement patterns of the image sections,
        detects the different subjects in the field of view on the basis of the groups of image sections, the first group of image sections corresponding to a first subject and the second group corresponding to a second subject.

2. The apparatus as claimed in claim 1, wherein the movement patterns are determined on the basis of frame detection.

3. The apparatus as claimed in claim 1, wherein the identification unit is adapted to derive an alternating signal from the respective movement pattern for each of the image sections.

4. The apparatus as claimed in claim 3, wherein the identification unit comprises a frequency analysis device that analyses a frequency spectrum of the alternating signals in order to identify the vital signs.

5. The apparatus as claimed in claim 4, wherein the frequency analysis device is adapted to determine the spectral parameter on the basis of each of the alternating signals to identify the vital signs.

6. The apparatus as claimed in claim 5, wherein the frequency analysis device is adapted to determine a spectral energy of a predefined spectral range as the spectral parameter.

7. The apparatus as claimed in claim 1, wherein the first group of image sections is defined by selecting an initial image section on the basis of the spectral parameter and wherein image sections adjacent to the initial image section are selected as image sections of the first group on the basis the respective spectral parameter and the predefined threshold level.

8. The apparatus as claimed in claim 7, wherein the second group of image sections is defined by selecting an initial image section separated from the first group of image sections on the basis of the spectral parameter and wherein image sections adjacent to the initial image section are selected as connected image sections of the second group on the basis the respective spectral parameter and the predefined threshold level.

9. The apparatus as claimed in claim 7, wherein the image sections having the highest spectral parameter value are selected as the initial image sections.

10. A method for detecting different subjects on the basis of vital signs, comprising the steps of:
    detecting radiation from a field of view and providing image data from the field of view;
    defining image sections in the image data by dividing the field of view into sections;
    detecting movement patterns in the image sections;
    identifying a first group of connected image sections in which the detected movement pattern is indicative of a vital sign;
    identify a second group of connected image sections in which the detected movement pattern is indicative of a vital sign, the second group of connected image sections being separated from the first group of connected image sections; and
    identifying first and second subjects in the field of view on the basis of the first and second groups of connected image sections.

11. A computer readable non-transitory medium having instructions stored thereon which, when carried out on a computer, cause the computer to perform the method as claimed in claim 10.

12. The method as claimed in claim 10, further including:
    outputting a vital sign of the first subject based on the movement pattern from the first group of connected image sections; and
    outputting a vital sign of the second subject based on the movement pattern from the second group of connected image sections.

13. An apparatus for detecting different subjects on the basis of vital signs, comprising:
    a camera configured to detect radiation from a field of view and provide image data from the field of view;
    one or more processors configured to:
        receive the image data from the camera,
        subdivide the field of view into image sections,
        detect movement patterns in the image sections,
        based on the detected movement patterns, identifying vital signs in a plurality of the image sections,
        combining image sections in which vital signs have been identified into a plurality of groups of image sections, each group including connected image sections in which the vital signs were identified, the groups being separated from each other, and
        associating each group with a different one of the subjects to detect the different subjects.

14. The apparatus as claimed in claim 13, wherein the one or more processors is further configured to:
    deriving an alternating signal from the motion pattern in each of the image sections;
    analyzing a frequency spectrum of the alternating signals to identify the vital signs.

15. The apparatus as claimed in claim 14, wherein the one or more processors is further configured to identify a first of the subjects by:

identifying a first group of connected image sections based on the spectral parameter and a predefined threshold value, the first group corresponding to a first of the subjects.

16. The apparatus as claimed in claim 15, wherein the one or more processors is further configured to identify a second of the subjects by:

identifying a second group of connected image sections based on the spectral parameter and a predefined threshold value, the second group corresponding to a second of the subjects.

17. The apparatus as claimed in claim 15, wherein the one or more processors are configured to define the first group of connected image sections by:

selecting an initial image section based on the spectral parameter; and selecting image sections adjacent to the initial image section based on the spectral parameter and the predefined threshold level.

18. The apparatus as claimed in claim 17, wherein the one or more processors are configured to select the initial image section by:

finding an initial image section with the highest value of the spectral parameter.

19. The apparatus as claimed in claim 17, wherein the one or more processors are configured to define the second group of connected image sections by:

selecting a second initial image section based on the spectral parameter; and selecting image sections adjacent to the second initial image section based on the spectral parameter and the predefined threshold level.

* * * * *